United States Patent [19]
Fowler

[11] Patent Number: 5,728,411
[45] Date of Patent: Mar. 17, 1998

[54] MIXING SYSTEM FOR DISPENSING MEASURED VOLUMES OF KNEADABLE MATERIAL

[75] Inventor: David Wayne Fowler, Atoka, Tenn.

[73] Assignee: Exact Mixing Systems, Inc., Memphis, Tenn.

[21] Appl. No.: 560,169

[22] Filed: Nov. 20, 1995

[51] Int. Cl.⁶ .................................................. B29C 47/92
[52] U.S. Cl. ..................... 425/142; 425/182; 425/186; 425/188; 425/196; 425/205
[58] Field of Search ................... 425/182, 186, 425/108, 196, 142, 140, 136, 205, 309, 310, 192 R; 366/54, 200, 213, 215

[56] References Cited

U.S. PATENT DOCUMENTS

| | | | |
|---|---|---|---|
| 1,879,327 | 9/1932 | Kremmling . | |
| 2,449,625 | 9/1948 | Stuart, 2nd | 425/188 |
| 3,045,280 | 7/1962 | Bonnafoux | 425/186 |
| 3,292,207 | 12/1966 | Herrick . | |
| 3,664,779 | 5/1972 | La Warre | 425/205 |
| 3,728,057 | 4/1973 | Grundmann et al. | 425/136 |
| 3,755,526 | 8/1973 | Watanabe | 264/178 |
| 3,880,407 | 4/1975 | List | 259/9 |
| 3,891,365 | 6/1975 | Fischer | 425/205 |
| 4,112,545 | 9/1978 | Covington et al. | 17/45 |
| 4,124,341 | 11/1978 | Locker | 425/136 |
| 4,187,268 | 2/1980 | Sinnema | 264/151 |
| 4,245,972 | 1/1981 | Anders | 425/136 |
| 4,277,431 | 7/1981 | Peller | 264/148 |
| 4,296,061 | 10/1981 | Buckingham | 264/138 |
| 4,332,538 | 6/1982 | Campbell | 425/140 |
| 4,442,131 | 4/1984 | Nagy et al. | 426/518 |
| 4,536,144 | 8/1985 | Hehl | 425/136 |
| 5,223,279 | 6/1993 | Lambertus | 425/186 |
| 5,266,341 | 11/1993 | Morikawa et al. | 425/140 |
| 5,386,971 | 2/1995 | Ingram | 264/148 |
| 5,427,515 | 6/1995 | Muller et al. | 425/142 |
| 5,466,143 | 11/1995 | Suzuki et al. | 425/140 |

*Primary Examiner*—Jay H. Woo
*Assistant Examiner*—Iurie A. Schwartz
*Attorney, Agent, or Firm*—Baker, Donelson, Bearman & Caldwell

[57] ABSTRACT

A mixing system is provided for mixing and dispensing measured volumes of kneaded material. The system includes an adjustable frame, top and side feeder assemblies, a cutter assembly. The top feeder assembly is secured to the frame and maintains a supply of raw kneadable material and minor ingredients to the side feeder assembly. The side feeder assembly includes an input housing, receiving raw material from the top feeder assembly and a preblender housing in communication with the input housing. A pair of oppositely rotating helical screws are disposed within the input and preblender housings for transporting the kneadable material to the kneader cylinder. The input and preblender housings are detachably connected to one another and slidably mounted on the frame, for selective movement between operating and cleaning positions. The preblender housing is also rotatably mounted on the frame, which further facilitates cleaning the unit. The cutter assembly includes a blade assembly which is selectively activated based on the volume of material entering a cutter housing from the kneader cylinder. A knife blade rotates in a circular motion so as to periodically sever a desired volume of kneaded material. The blade rotates away from the stream of material to a safety position between cuts. The system incorporates several safety features which disengage an electric motor used to drive the blade assembly upon detection of various conditions.

45 Claims, 10 Drawing Sheets

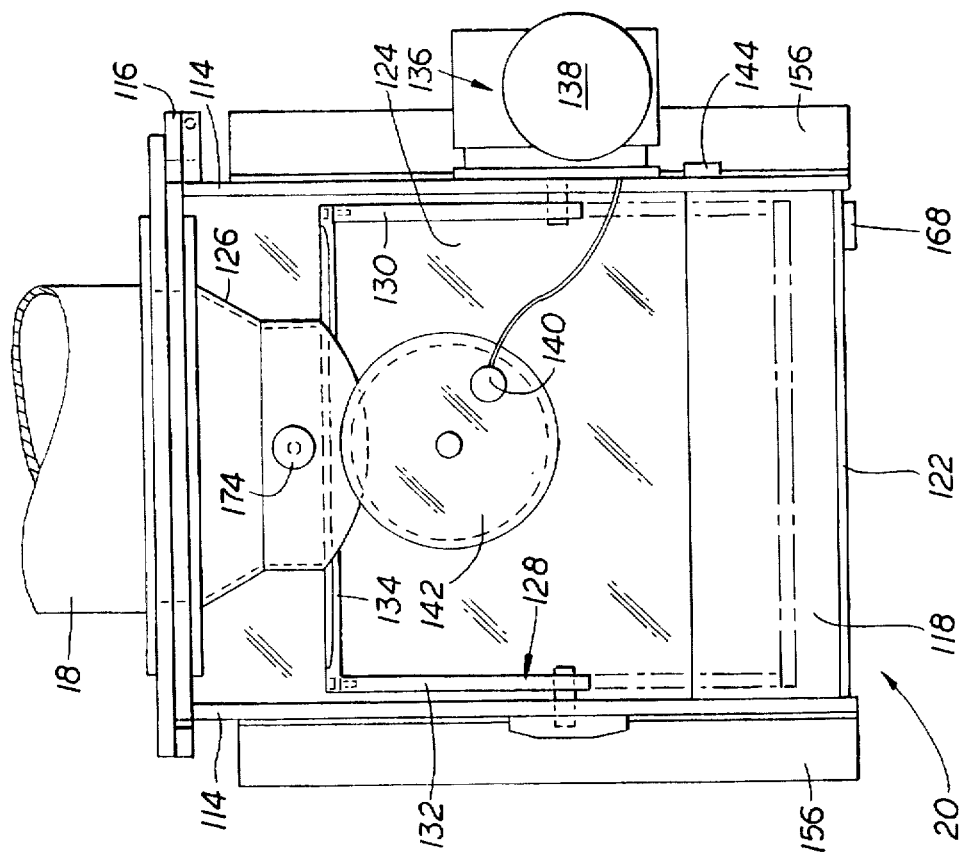
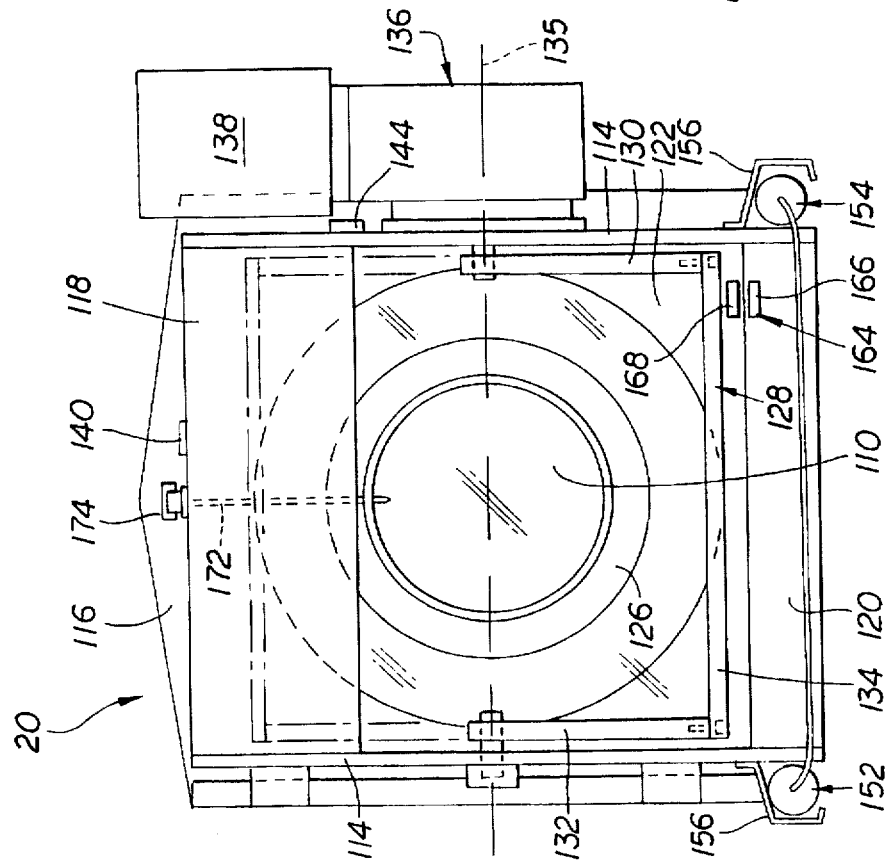
FIG. 11
FIG. 10

MIXING SYSTEM FOR DISPENSING MEASURED VOLUMES OF KNEADABLE MATERIAL

BACKGROUND

The present invention relates generally to mixing systems and more particularly to an improved mixing system for mixing and automatically dispensing measured volumes of kneadable material such as dough, clay, gum, or viscous flowable plastic products. In even greater particularity, the present invention relates to an improved mixing system which incorporates several redundant safety features and is designed to be slidably disassembled on a frame in a minimum amount of time for cleaning purposes.

At present, there appears to be no known commercially available mixing system that can be slidably disassembled on its own frame in a minimum amount of time for cleaning purposes. Most systems are designed such that their respective parts must be mechanically removed from the system before being subjected to any cleaning or sterilization process. Such procedure is tedious and usually requires several hours of "downtime" to complete. Moreover, since most commercial mixing systems employ large parts, there always exists the possibility of serious bodily injury to a user when attempting to remove such parts from the system.

Another disadvantage of the above type mixing system is its apparent inability to cut consistently sized pieces of kneadable material. In order to separate smaller pieces of material from a continuous stream of material, it has been common practice in such systems to utilize a double-edge knife in a timed guillotine-style motion to cut pieces from the continuous stream. In operation, the knife will cut a first piece of the material from the top down, and after a predetermined amount of time, will cut a second piece from the bottom up. Since this sequence of operation continues on a timed basis, the knife is maintained immediately above or below the continuous stream while it awaits a timed signal to cut again. However, because the cutting sequence is timed, inconsistent piece sizes are cut when the product stream changes rate. Moreover, the guillotine-style cutting action causes the severed pieces to fall at different locations on the conveyor belt which poses substantial problems downstream. As mentioned above, this type of mixing system is usually very difficult to clean. To clean product build-up on the knife, the knife must be mechanically removed from the system which, if no safety features are in place, can be hazardous.

In view of the foregoing disadvantages inherent in the known types of mixing systems, there is a need for an improved mixing system which incorporates several redundant safety features and is designed to be slidably disassembled in place on a frame in a minimum amount of time for cleaning purposes. There is a further need for an improved mixing system that cuts in response to piece volume rather than time wherein a rotary cutter blade rotates away from a product stream to a safety position between cuts.

SUMMARY

The present invention addresses the above needs by providing an improved mixing system which employs a plurality of safety features and is designed to be slidably disassembled in place on a frame in a minimum amount of time for cleaning purposes. The present invention is designed to automatically cut pieces of kneaded material extruded from a continuous product stream based on piece volume rather than time wherein a rotary cutter blade cuts in one direction and rotates away from the product stream to a safety position between cuts.

In operation, the mixing system mixes and dispenses precise volumes of kneaded material. It includes a frame having a plurality of adjustable jacks for adjusting the level of the frame which enhances the flow of the kneadable material and the drainage of liquids. A top feeder assembly is operatively attached to the frame for maintaining a supply of raw kneadable material and other minor ingredients. Preblending or mixing of the raw kneadable material with minor ingredients and preselected liquids is accomplished by a side feeder assembly. The side feeder assembly is slidably mounted on the frame below the top feeder assembly for selective movement between an operating position and a cleaning position. When in the operating position, the side feeder assembly communicates with the top feeder assembly for receiving and preblending the supply of raw kneadable material, minor ingredients and liquids. Once sufficiently preblended, the kneadable material is discharged from the side feeder assembly into a kneader cylinder for kneading.

The kneader cylinder is operatively mounted on the frame and is in communication with the side feeder assembly when in its operating position. The cylinder has an inlet for receiving the preblended kneadable material discharged from the side feeder assembly and an outlet for extruding a continuous stream of kneaded material. A cutter assembly is hingedly attached to the kneader cylinder for automatically cutting predetermined volumes of the kneaded material from the continuous stream extruded through the outlet. The cutter assembly is responsive to piece volume rather than time and is selectively movable between a closed operating position and an open cleaning position.

The side feeder assembly includes a preblender housing which comprises first and second end plates with first and second communicating or contiguous tubular portions connected therebetween. The tubular portions have an exterior surface and a communicating passage extending therethrough which is in communication with the first and second openings defined in the first and second end plates, respectively. As mentioned above, the side feeder assembly includes a means for slidably mounting the preblender housing on the frame. The preblender housing is slidably movable between the operating position wherein the first end plate is detachably connected to the kneader cylinder such that the first opening in the preblender housing communicates with the inlet in the kneader cylinder during operation. In the cleaning position, the preblender housing is detached from the kneader cylinder and slidably displaced on the frame a predetermined distance away from the cylinder allowing easy access to the preblender housing for cleaning purposes. The means for slidably mounting the preblender housing on the frame further includes a rotation means for rotatably mounting the preblender housing on the frame. As such, the preblender housing is capable of rotating about an axis generally normal to the frame when in the cleaning position.

The above means for slidably mounting the conveyor housing on the frame is comprised of at least two substantially parallel rails disposed on the frame at an angle relative to the inlet on the kneader cylinder. A support plate extends laterally between the rails and has a couple of linear bearings attached to a bottom surface thereof for slidably mounting the support plate on the rails. A rotatable support post is attached intermediate the support plate and the preblender housing which rotatably supports the preblender housing.

Thus, the preblender housing is slidably movable with the support plate on the frame between the operating position and the cleaning position and can be rotated when in the cleaning position.

The side feeder assembly also includes an input housing having first and second end walls and first and second side walls which define a rectangular inlet for receiving the supply of raw kneadable material and other ingredients from the top feeder assembly. The first end wall includes an outlet for discharging the kneadable material from the input housing. The lower portions of the first and second side walls converge inwardly to define first and second lower semi-tubular channels, respectively. Similar to the preblender housing, the side feeder assembly includes a means for slidably mounting the input housing on the frame so that the input housing is slidably movable between the operating position wherein the first end wall is detachably connected to the second end plate on the preblender housing allowing communication between the outlet and the second opening during operation. In the cleaning position, the input housing is detached from the preblender housing and slidably displaced on the frame a predetermined distance therefrom allowing easy access to the input housing for cleaning purposes.

The above means for slidably mounting the input housing on the frame comprises the two substantially parallel rails disposed on the frame at an angle relative to the inlet on the kneader cylinder. A pair of upright side support plates are longitudinally disposed directly above each of the rails. Each plate has at least one linear bearing secured to a bottom edge thereof for slidably mounting the plates on the rails, respectively. The side support plates are interconnected by at least two vertically disposed laterally extending crossmembers and at least two horizontally disposed laterally extending crossplates. The input housing is attached to the vertically disposed crossmembers for sliding movement therewith on the frame between the operating position and the cleaning position. Preferably, the rails are disposed on the frame generally perpendicular to the inlet on the kneader cylinder.

The side feeder assembly further comprises a bushing plate attached to the first end plate of the preblender housing and is disposed between the first end plate and the kneader cylinder when the preblender housing is in the operating position. The bushing plate includes a pair of bushings for operatively engaging a preblending means, discussed below.

The side feeder assembly further includes a preblending means which is operatively disposed within both the input housing and the preblender housing when both are in their operating positions for preblending the supply of raw kneadable material and other ingredients. In operation, the preblending means mixes and conveys the kneadable material from the input housing through the preblender housing into the kneader cylinder. The preblending means is slidably removable from the input housing and preblender housing when they are in their cleaning positions. A driving means is attached to the input housing and operatively connected to the preblending means for driving the preblending means. The driving means comprises an electric motor and gear box operatively attached to the second end wall of the input housing. The gear box has a pair of output shafts which extend through the second end wall into the input housing for operatively engaging the preblending means. The shafts are rotated in opposite directions with respect to each other during operation.

The preblending means comprises a pair of oppositely threaded helical screws slidably mounted on the pair of output shafts extending into the input housing. When both housings are in their operating positions, the screws extend through the input housing in the first and second lower semi-tubular channels, respectively, through the outlet in the first end wall, through the second opening in the second end plate, through the passage in the tubular portions, through the first opening in the first end plate, wherein they operatively engage the bushings on the bushing plate.

The side feeder assembly further includes a means, operatively attached to the preblender housing, for regulating the temperature of the preblender housing. The temperature regulating means comprises a water jacket substantially encasing the tubular portions of the preblender housing defining a chamber between the exterior surface of the tubular portions and an interior surface of the water jacket. The water jacket includes a water inlet and water outlet both in fluid communication with the chamber wherein temperature controlled water is injected into the chamber through the inlet and allowed to drain through the outlet, thereby regulating the temperature of the preblender housing.

The side feeder assembly further includes a means, operatively attached to the preblender housing and in fluid communication with the passage, for adding preselected liquids to the supply of kneadable material in the preblender housing. The liquid supply means comprises a plurality of check valves operatively attached to the tubular portions of the preblender housing for engaging pressurized liquid supply hoses.

The cutter assembly comprises a housing having a first opening for receiving the continuous stream of kneaded material extruded from the outlet on the kneader cylinder. The housing is hingedly attached to the kneader cylinder for selective movement between the closed operating position wherein the first opening is in communication with the outlet. In the open cleaning position, the housing is rotated away from the kneader cylinder for cleaning purposes. The housing has a second opening for discharging severed pieces of the kneaded material. Structurally, the housing is a box-like housing having a pair of side plates, a back plate, an angled front upper support plate, a transparent front door, and a transparent top cover wherein the back plate defines the first opening and the lower portions of side plates, the front lower support plate, and the back plate define the second rectangular opening. The housing further includes a discharge cone attached to an interior surface of the back plate. The discharge cone is co-axially aligned and concentrically disposed with respect to the first opening for optimally shaping the continuous stream of kneaded material entering the housing through the first opening. The transparent front door is slidably mounted between the pair of side plates such that the door is slidably movable between an open position and a closed position.

A blade assembly is rotatably mounted within the housing for cutting a predetermined volume of kneaded material from the continuous stream entering the housing through the first opening and discharge cone. The blade assembly has a safety home position distal the first opening and discharge cone. The blade assembly comprises first and second knife arms each rotatably mounted at one end to an interior surface of the pair of side plates, respectively. The first and second knife arms are interconnected at an opposite end distal the one end by a laterally extending knife blade. In operation, the knife blade passes in close proximity to the discharge cone severing a predetermined volume of kneaded material that has extruded therefrom.

In order to rotate the blade assembly, the first knife arm is operatively connected to an electric drive means which is attached to the housing. The electric drive means is selectively energizable to selectively rotate the blade assembly within the housing and comprises an electric motor having an internal brake.

A first sensor means is attached to the housing and electrically connected to the electric drive means for detecting when the predetermined volume of kneaded material has entered the housing through the first opening and discharge cone. In operation, the first sensor means produces a first signal upon detecting the predetermined volume wherein the first signal energizes the electric drive means to start rotating the blade assembly. The transparent top cover of the housing includes a selectively rotatable disk for rotatably positioning the first sensor means on the top cover relative the discharge cone. The first sensor means is attached to an outer periphery of the disk wherein rotation of the disk to a preselected orientation defines an axial distance between the first sensor means and the discharge cone which dictates the predetermined volume of said kneaded material (i.e., how much material is extruded from the discharge cone). The first sensor means comprises a proximity switch.

A second sensor means is selectively attached to the housing and electrically connected to the electric drive means for defining the home position of the blade assembly. The second sensor means detects when the blade assembly is at the home position and produces a second signal which de-energizes the electric drive means so that the blade assembly remains at the home position until the electric drive means is re-energized by the first signal. The second sensor means comprises a proximity switch selectively attached to one of the pair of side plates such that the home position of the blade assembly is directly adjacent an interior surface of the angled front upper support plate. The knife blade remains in close proximity to the interior surface of the angled front upper support plate while in the home position for safety purposes.

A third sensor means is attached to the housing and electrically connected to the electric drive means for detecting the presence of an object, such as an arm or hand, in the second discharge opening. The third sensor means produces a third signal upon detecting the presence of the object in the second opening wherein the third signal de-energizes the electric drive means until the object is removed from the second opening. The pair of side plates define first and second opposing elongated slots on a lower portion thereof, respectively, for operatively engaging the third sensor means. The third sensor means comprises an infrared curtain emitter and an infrared curtain receiver mounted on exterior surfaces of the pair of side plates adjacent the first and second opposing elongated slots, respectively. The emitter emits an infrared curtain through the first slot, across the second opening, through the second slot, into the receiver. The housing further includes a pair of infrared curtain guards attached to the exterior surfaces of the side plates so as to substantially enclose the infrared curtain emitter and infrared curtain receiver, respectively.

A fourth sensor means is attached to both the housing and the kneader cylinder and electrically connected to the electric drive means for detecting when the housing is rotated in the open cleaning position. The fourth sensor means produces a fourth signal upon detecting the housing in the open cleaning position wherein the fourth signal de-energizes the electric drive means until the housing is returned to the closed operating position. The fourth sensor means comprises a magnetic limit switch having electrically communicating first and second portions. The first portion is attached to the back plate and the second portion is attached to the kneader cylinder in close proximity to the first portion.

A fifth sensor means is attached to both the transparent front door and the front lower support plate and electrically connected to said electric drive means for detecting when the front door is in the open position. The fifth sensor means produces a fifth signal upon detecting the door in the open position wherein the fifth signal de-energizes the electric drive means until the door is returned to the closed position. The fifth sensor means comprises a magnetic limit switch having electrically communicating first and second portions. The first portion is attached to an exterior surface of the front lower support plate. The second portion is attached to an exterior surface of the front door and is in close proximity to the first portion. When the two portions are separated such as when the door is slid open, the switch produces the fifth signal.

The cutter assembly further comprises a temperature means, operatively attached to the housing, for determining the temperature of the continuous stream of kneaded material in the discharge cone. The temperature means comprises a temperature probe extending downwardly from the transparent top cover into the discharge cone. It includes a temperature indication means positioned on an exterior surface of the transparent top cover for visually indicating the temperature of the continuous stream of kneaded material in the discharge cone.

There has thus been outlined, rather broadly, the more important features of the present invention in order that the detailed description thereof that follows may be better understood, and that the present contribution to the art may be better appreciated. There are, of course, numerous other novel features of the present invention that will become apparent from a study of the drawings and the description and which will form the subject matter of the claims appended hereto.

Moreover, it is to be understood that the phraseology and terminology employed herein are for the purpose of description and should not be regarded as limiting. As such, those skilled in the art will appreciate that the conception, upon which this disclosure is based, may readily be utilized as a basis for the designing of other systems for carrying out the several purposes of the present invention. It is important, therefore, that the claims be regarded as including such equivalent systems insofar as they do not depart from the spirit and scope of the present invention.

BRIEF DESCRIPTION OF THE DRAWINGS

These and other features, aspects, and advantages of the present invention will become better understood with regard to the following description, appended claims, and accompanying drawings where:

FIG. 10 is a front elevational view of the cutter assembly; and

FIG. 11 is a top plan view of the cutter assembly.

DESCRIPTION

Figure 1:
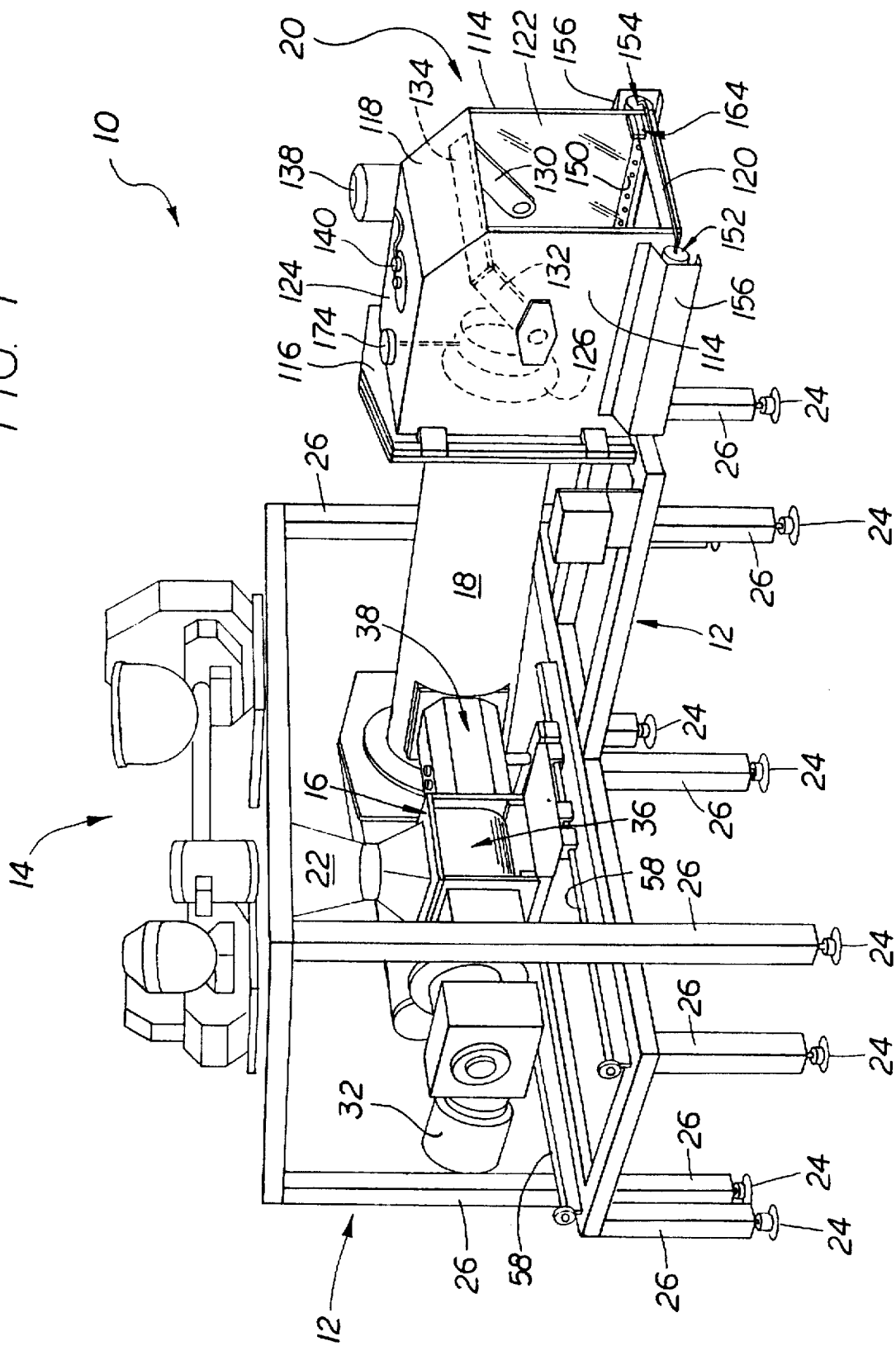
FIG. 1 is a perspective view of a representative mixing system having a frame, a top feeder assembly, a side feeder assembly shown in an operating position, a kneader cylinder, and a cutter assembly shown in a closed operating position, which embody the features of the present invention.
Figure 2:
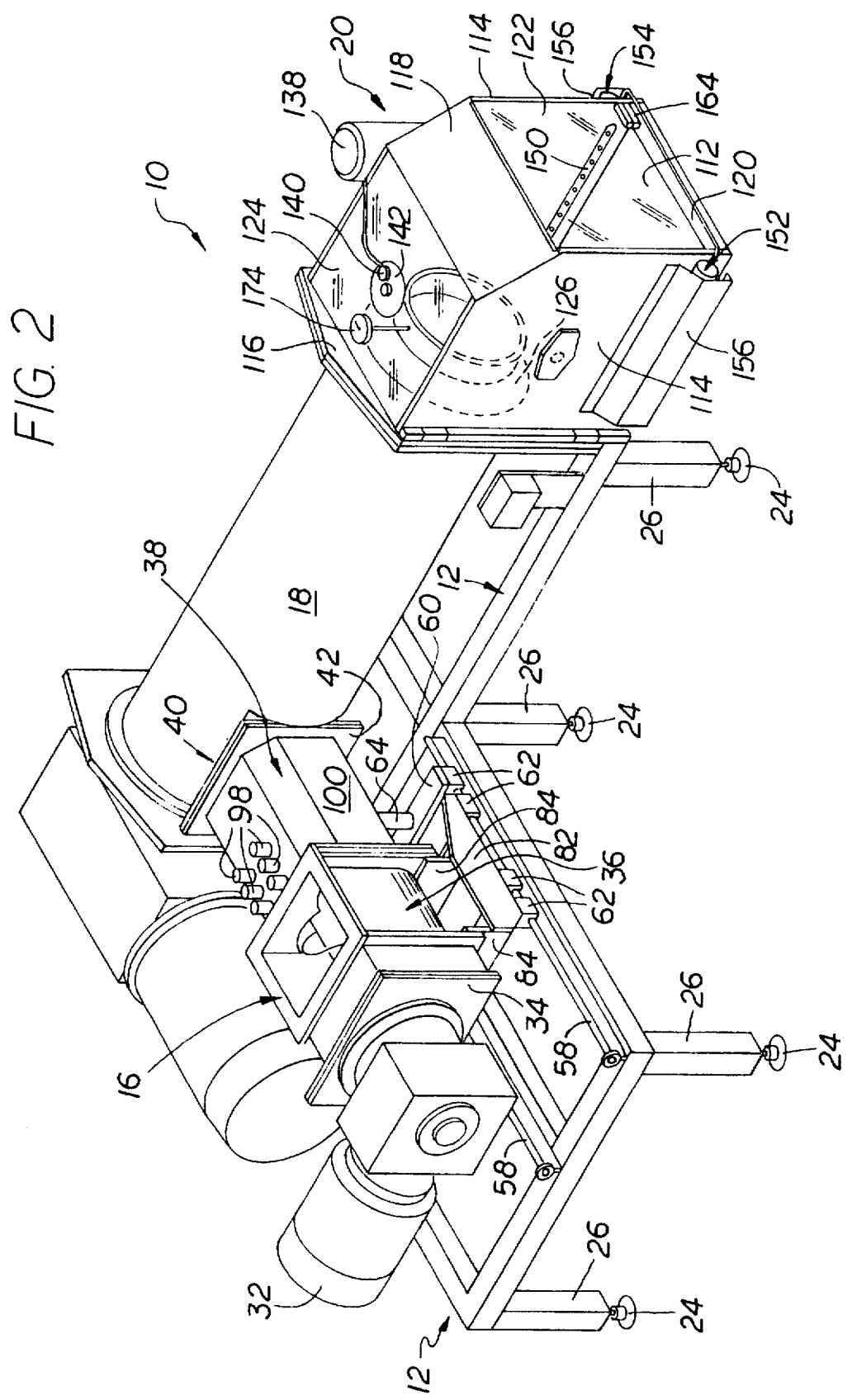
FIG. 2 is a perspective view of the representative mixing system of FIG. 1 shown without the top feeder assembly.

Referring now in more detail to the drawings, in which like numerals indicate like parts throughout the several views, FIG. 1 illustrates a representative mixing system 10 including an adjustable frame 12, a top feeder assembly 14, a side feeder assembly 16, a kneader cylinder 18, and a cutter assembly 20. Although the mixing system 10 is primarily used to manufacture food products made from dough, such as bread, pretzels and other snack items, system 10 can be used to cut consistently uniform pieces from any type of kneadable material including gum, clay, or viscous flowable plastic. As discussed below in greater detail, the system 10 incorporates a plurality of safety features and is slidably disassembled in place on frame 12 in a minimum amount of time for cleaning purposes. In operation, once a preselected recipe of kneadable material is mixed, the system 10 then kneads the material and produces a continuous output product stream which is automatically cut into smaller consistently sized pieces based on volume rather than time.

The primary function of the top feeder assembly 14 is to provide a continuous supply of preselected raw kneadable material (not shown) and other minor ingredients to the side feeder assembly 16 during operation. As illustrated in FIG. 1, actual transfer of material to side feeder assembly 16 is through transitioner 22. The top feeder assembly 14 is secured to frame 12 and is strategically positioned above both the side feeder assembly 16 and kneader cylinder 18. In order to enhance the flow of kneadable material and drainage of liquids, adjustable frame 12 includes a plurality of adjustable jacks 24 at the lower end of leg portions 26. In operation, the top feeder assembly 14 maintains the supply of raw kneadable material and minor ingredients and feeds the same into side feeder assembly 16 as needed. It should be noted that the top feeder assembly 14 may assume a variety of configurations depending on the type and/or amount of material processed by system 10. In this regard, while assembly 14 is illustrated and described in its simplest form, it is to be considered representative of more sophisticated embodiments.

The kneader cylinder 18 is operatively mounted on frame 12 and is in communication with side feeder assembly 16 during operation. Cylinder 18 has an inlet 28 (shown in FIG. 9) for receiving preblended kneadable material discharged from side feeder assembly 16 and an outlet 30 (shown in FIG. 6) for extruding a continuous stream of kneaded material. The internal configuration of cylinder 18 is material specific, thus may also assume a variety of internal configurations depending on the type and/or amount of material. Again, while cylinder 18 is illustrated and described in its simplest form, it is to be considered representative of more sophisticated embodiments so long as it is capable of kneading and extruding the continuous stream of the kneaded material.

As briefly mentioned above, preblending or mixing of the raw kneadable material and minor ingredients is accomplished by side feeder assembly 16. The side feeder assembly 16 is slidably mounted on frame 12 below the top feeder assembly 14 for selective movement between an operating position, shown in FIGS. 1–4, and a cleaning position, shown in FIGS. 5 and 6. When in the operating position, the side feeder assembly 16 communicates with transitioner 22 of the top feeder assembly 14 for receiving and preblending the supply of raw kneadable material, minor ingredients and liquids. Once sufficiently preblended, the kneadable material is discharged from the side feeder assembly 16 into the kneader cylinder 18 for kneading.

Figure 5:
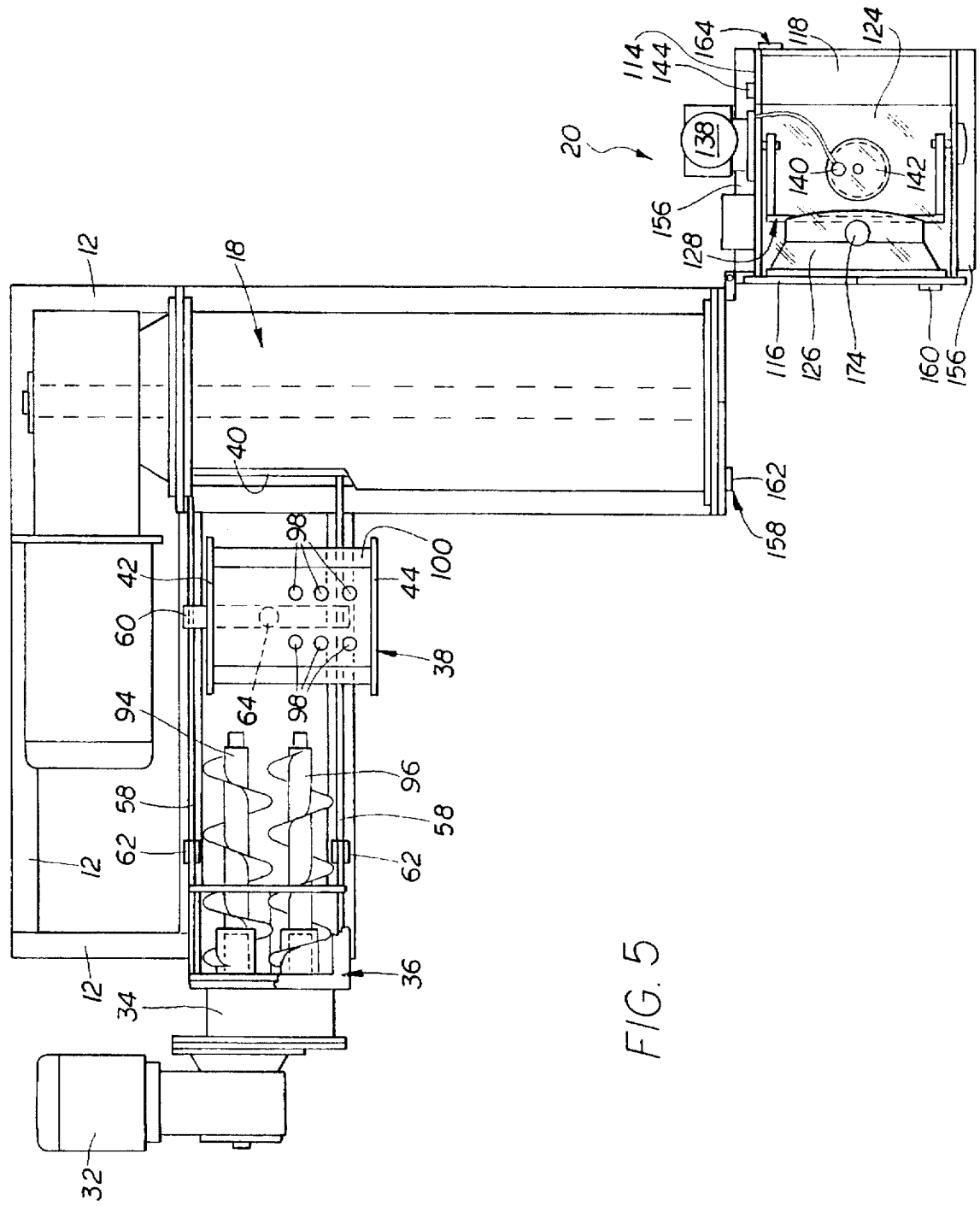
FIG. 5 is a top plan view of the representative mixing system of FIG. 2 but showing the side feeder assembly and cutter assembly in a cleaning position.
Figure 6:
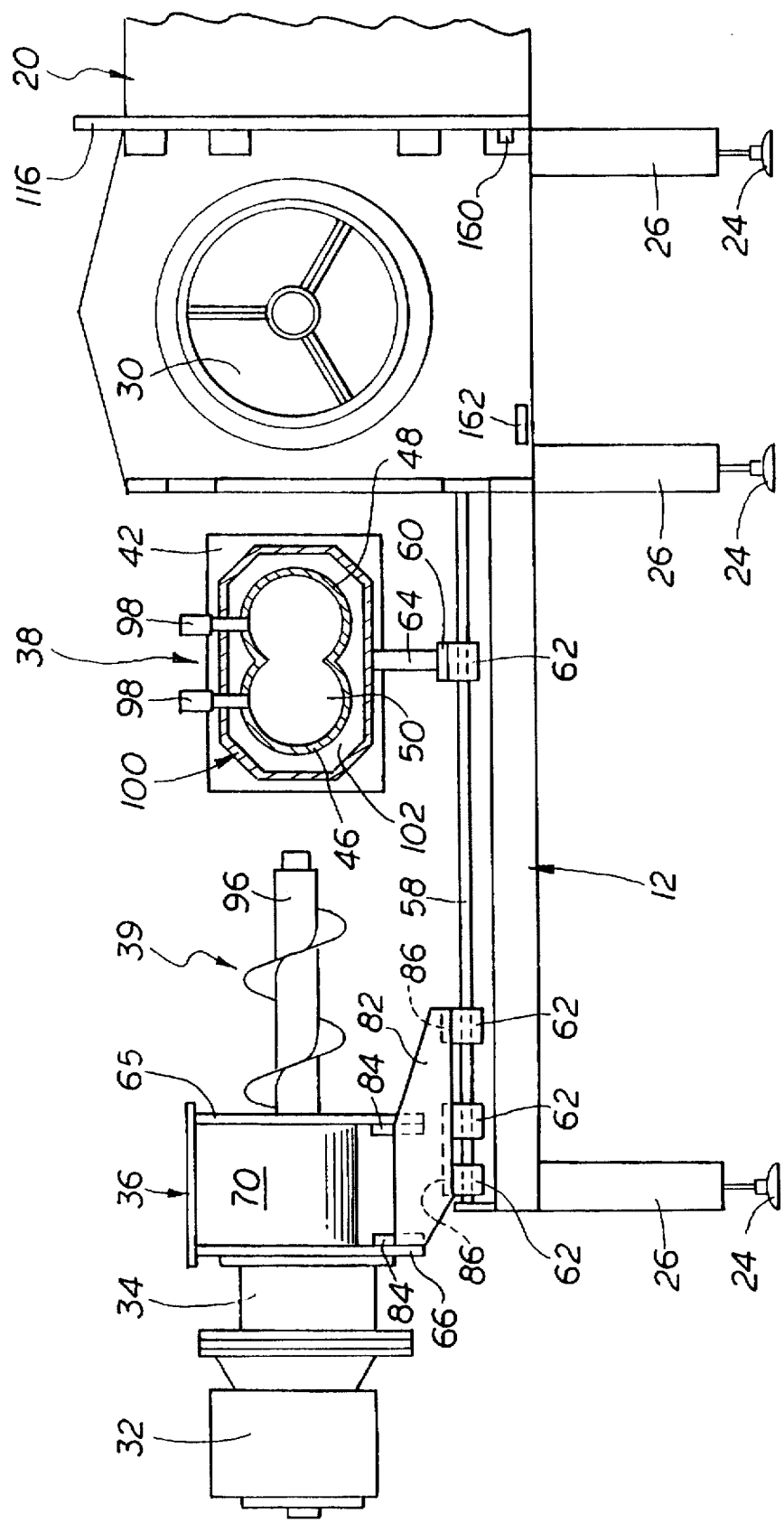
FIG. 6 is a front elevational view of the representative mixing system of FIG. 5.
Figure 7:
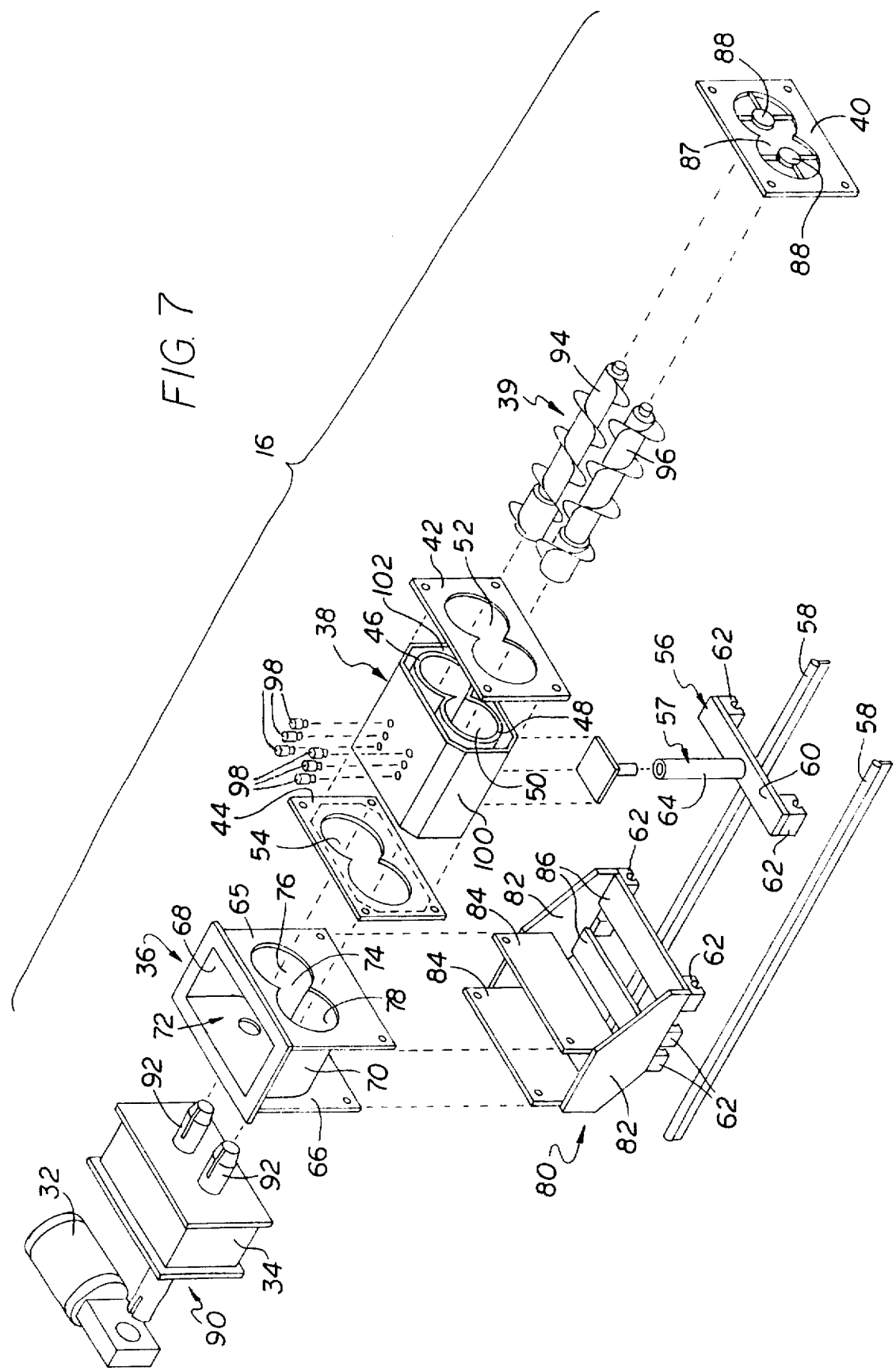
FIG. 7 is an exploded perspective view of the side feeder assembly.
Figure 8:
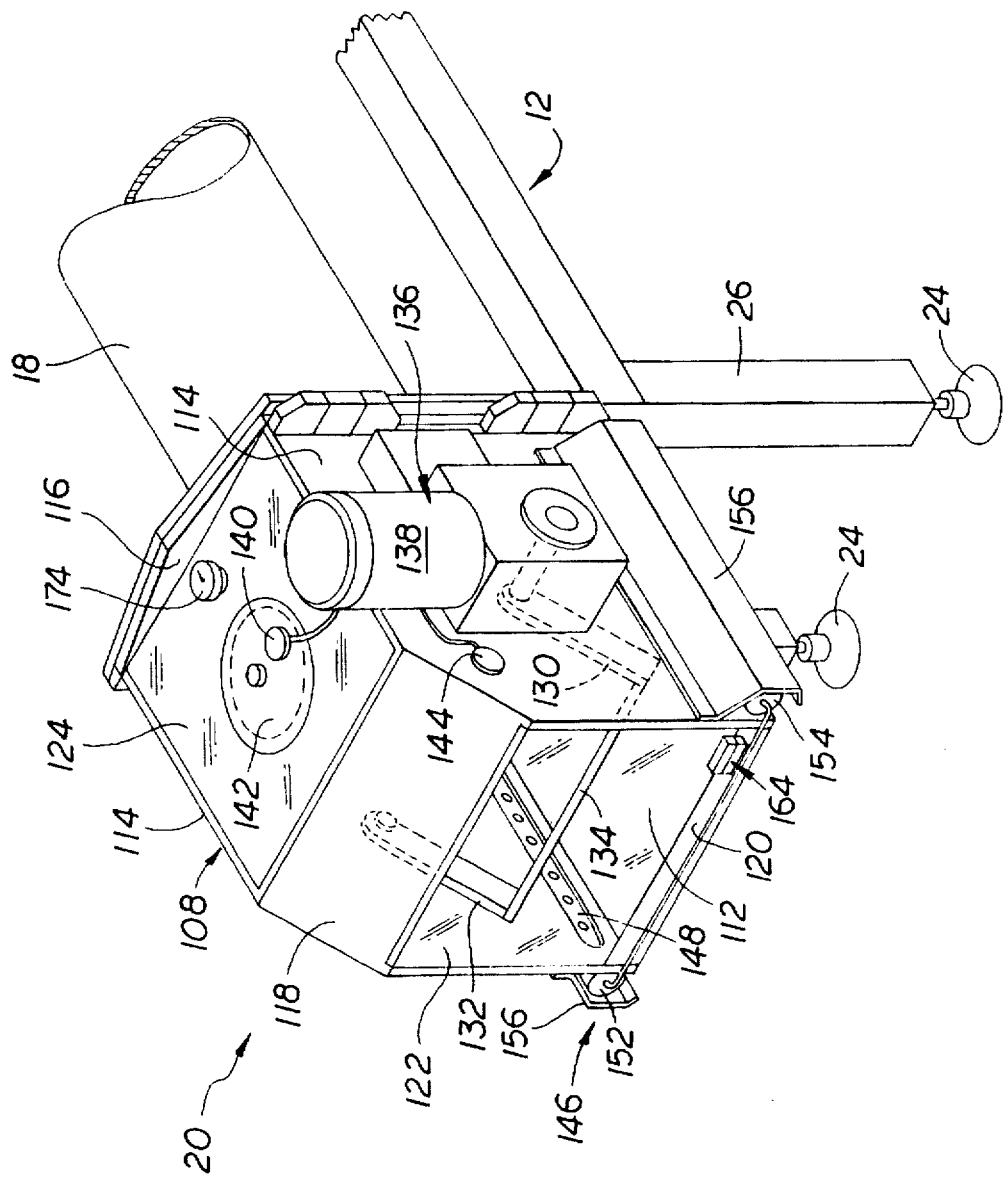
FIG. 8 is a perspective view of the cutter assembly.

As shown most clearly in FIG. 7, the side feeder assembly 16 includes a conventional electric motor 32, a gear box 34, an input housing 36, a preblender housing 38, a preblending means 39, and a spider bushing plate 40. The preblender housing 38 is comprised of first 42 and second 44 end plates with first 46 and second 48 communicating or contiguous tubular portions connected therebetween. Tubular portions 46 and 48 have an exterior surface and a communicating passage 50 extending therethrough which is in communication with first 52 and second 54 openings defined in first 42 and second 44 end plates, respectively. As briefly mentioned above, the side feeder assembly 16 includes a means 56 for slidably mounting the preblender housing 38 on frame 12. When the preblender housing 38 is in the operating position, the first end plate 42 is detachably connected by catch bolts (not shown) to kneader cylinder 18 such that first opening 52 is aligned and communicates with inlet 28 during operation. When in the cleaning position, the preblender housing 38 is detached from kneader cylinder 18 and slidably displaced on frame 12 a predetermined distance away from cylinder 18. As illustrated in FIGS. 5 and 6, the predetermined distance is sufficient to allow easy access to the preblender housing 38 for cleaning purposes.

Again referring to FIG. 7, the means 56 for slidably mounting preblender housing 38 on frame 12 further includes a rotation means 57 for rotatably mounting the preblender housing 38 on frame 12. The rotation means 57 allows the preblender housing 38 to rotate about an axis generally normal to frame 12 when in the cleaning position. Means 56 is comprised of at least two substantially parallel rails 58 disposed on frame 12 at an angle relative to the inlet 28 on the kneader cylinder 18. Preferably, the rails 58 extend generally perpendicular to inlet 28. A support plate 60 laterally extends between rails 58 and includes a pair of conventional linear bearings 62 attached to a bottom surface thereof for slidably mounting support plate 60 on rails 58. Means 57 comprises a rotatable support post 64 attached intermediate support plate 60 and preblender housing 38 which rotatably supports the preblender housing 38. As such, the preblender housing 38 is slidably movable with the support plate 60 on frame 12 between the operating position and cleaning position and can be freely rotated when in the cleaning position.

Input housing 36 is comprised of first 65 and second 66 end walls and first 68 and second 70 side walls. The upper portions of end walls 65 and 66 and side walls 68 and 70 define an upper rectangular inlet 72 for receiving the supply of raw kneadable material and other ingredients from the top feeder assembly 14. Inlet 72 is in communication with transitioner 22 during operation. First end wall 65 further defines an outlet 74 for discharging the kneadable material from the input housing 36. Lower portions of side walls 68 and 70 converge inwardly to define first 76 and second 78 lower semi-tubular channels, respectively.

The side feeder assembly 16 further includes a means 80 for slidably mounting the input housing 36 on frame 12 so that the input housing 36 is slidably movable between the operating and cleaning positions. When the input housing 36 is in the operating position, first end wall 65 is detachably connected by catch bolts (not shown) to the second end plate 44 on the preblender housing 38 allowing communication between outlet 74 and second opening 54 during operation. When in the cleaning position, the input housing 36 is detached from the preblender housing 38 and slidably displaced on frame 12 a predetermined distance therefrom. As shown in FIGS. 5 and 6, the predetermined distance is sufficient to allow easy access to the input housing 36 for cleaning purposes.

Means 80 for slidably mounting the input housing 36 on frame 12 also utilizes rails 58 which are disposed on frame 12 at an angle relative to the inlet 28 on kneader cylinder 18. Means 80 includes a pair of upright side support plates 82 which are longitudinally disposed directly above rails 58, respectively. Each plate 82 includes at least one conventional linear bearing 62 secured to a bottom edge thereof for slidably mounting the plates 82 on rails 58. The side support plates 82 are interconnected by at least two vertically disposed laterally extending crossmembers 84 and at least two horizontally disposed laterally extending crossplates 86. First 65 and second 66 end walls of the input housing 36 are rigidly attached to the vertically disposed crossmembers 84, respectively, for sliding movement therewith on frame 12 between the operating and cleaning positions.

Figure 3:
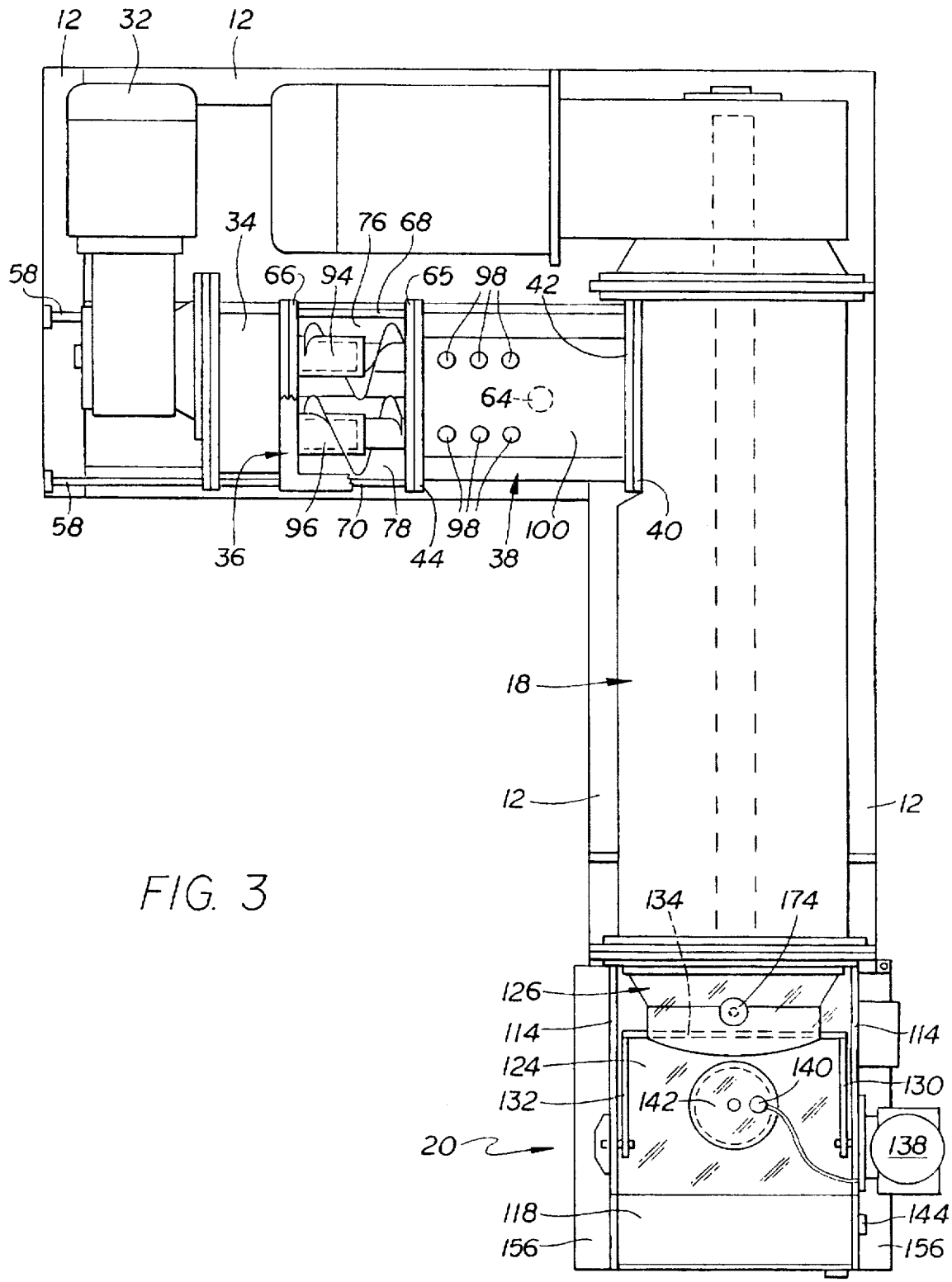
FIG. 3 is a top plan view of the representative mixing system of FIG. 2.
Figure 4:
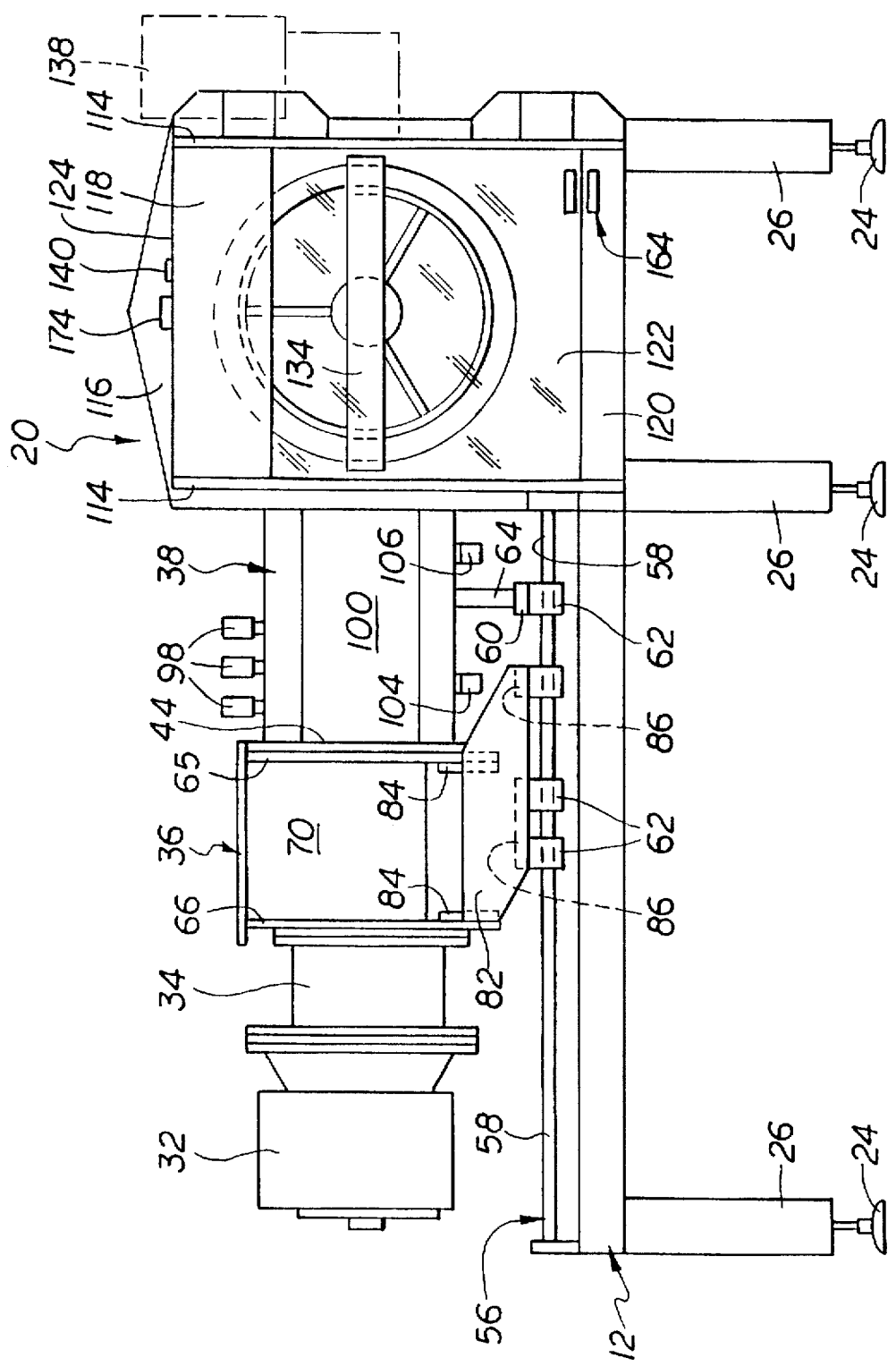
FIG. 4 is a front elevational view of the representative mixing of FIG. 2.

As most clearly shown in FIGS. 3, 5 and 7, the bushing plate 40 is attached to the first end plate 42 of the preblender housing 38 and is disposed between the first end plate 42 and kneader cylinder 18 when the preblender housing 38 is in the operating position. Bushing plate 40 includes opening 87 and a pair of conventional bushings 88 for operatively engaging the preblending means 39 which is operatively disposed within both the input housing 36 and the preblender housing 38 when both are in their operating positions. In operation, the preblending means 39 preblends or mixes the supply of kneadable material and minor ingredients while conveying the material from the input housing 36 through the preblender housing 38 into the kneader cylinder 18. The preblending means 39 is slidably removable from the input housing 38 and preblender housing 38 when in their cleaning positions.

Electric motor 32 and gear box 34, which comprise driving means 90, are operatively attached to the second end wall 66 of the input housing 36. The gear box 34 includes a pair of output shafts 92 which extend through the second end wall 66 partially into input housing 36 for operatively engaging the preblending means 39. Shafts 92 rotate in opposite directions with respect to each other during operating. The preblending means 39 comprises a pair of oppositely threaded helical screws 94 and 96 slidably mounted on the pair of output shafts 92 for rotation therewith. When both housings 36 and 38 are in their operating positions, shown in FIGS. 1–4, screws 94 and 96 extend through the lower portion of input housing 36 in the first 76 and second 78 lower semi-tubular channels, respectively, through the outlet 74 in the first end wall 65, through the second opening 54 in the second end plate 44, through passage 50 in tubular portions 46 and 48, through the first opening 52 in the first end plate 42, wherein they operatively engage bushings 88 in bushing plate 40. Thus, helical screws 94 and 96 are arranged in parallel, side-by-side relationship so that the threads of one screw fit into the gaps between the threads of the other screw to provide positive displacement of the kneadable material during operation. Motor 32 and gear box 34 function to rotate helical screws 94 and 96 in opposite directions of rotation so that the raw kneadable material received into the input housing 36 tends to feed downwardly into the space between the screws 94 and 96 whereupon it is positively displaced along semi-tubular channels 76 and 78 through tubular portions 46 and 48 where is it further mixed with preselected liquids.

The sliding transition of the side feeder assembly 16 from the operating position to the cleaning position occurs as follows. First, the first end plate 42 and bushing plate 40 are detached from cylinder 18. Next, the input housing 36, still having the preblender housing 38 attached to it, is slidably displaced to its cleaning position shown in FIGS. 5 and 6. By detaching the second end plate 44 from the first end wall 65, the preblender housing 38 may be slidably displaced to its cleaning position shown in FIGS. 5 and 6. The preblender housing 38 may be freely rotated on support post 64 at this time but is shown rotated 90 degrees in FIGS. 5 and 6. As shown, screws 94 and 96 are protruding out of the input housing 36 but may be slidably removed therefrom for cleaning purposes. The advantage of the sliding capability of side feeder assembly 16 is that the respective parts may be easily accessed for maintenance and cleaning while substantially reducing the possibility of injury. Although only one method of transition is discussed, it should be well understood that the order of steps may change depending on the circumstances or the user's preference.

In most instances, the raw kneadable material introduced into the side feeder assembly 16 must have some type of liquid added to it in order to complete the mixing of the material. The type and amount of liquid will directly depend on the type of raw kneadable material being processed by the system 10. For instance, if the material is a food product, the liquids required may include water, oil, egg, syrup, yeast, malts and/or dyes. A plurality of one-way check valves 98 are operatively attached to the preblender housing 38 and are in fluid communication with passage 50. The valves 98 extend outwardly from the preblender housing 38 where they operatively engage pressurized liquid supply hoses (not shown). Preferably, the valves 98 are 10 psi spring loaded pressure relief valves which substantially prevent leakage of liquid into the preblender housing 38 if the supply pressure falls below 10 psi. In operation, any combination of the above types of liquid may be introduced into the preblender housing 38.

Moreover, during operation or cleaning of the mixing system 10, it is necessary to regulate the temperature of the preblender housing 38. For instance, during cleaning operations, the temperature of the housing 38 is sufficiently elevated to kill bacteria growth therein. On the other hand, during operation, the temperature of the kneadable material moving through the housing 38 may have to be reduced, depending on the operating temperature and/or ambient temperature, to maintain its malleability. Regulation of the temperature is accomplished by passing sufficiently hot or cold water over the tubular portions 46 and 48 of the preblender housing 38. In order to maintain uniform heating or cooling, the tubular portions 46 and 48 are substantially encased by a water jacket 100 which defines a chamber 102 between the exterior surfaces of tubular portions 46 and 48 and the interior surface of the water jacket 100. The water jacket 100 extends the length of the preblender housing 38 terminating at first 42 and second 44 end plates. The water jacket 100 also includes a water inlet 104 and a water outlet 106 which are threaded for engagement with conventional water hoses (not shown) that are in communication with a water supply and drainage means (not shown), respectively. In operation, temperature controlled water is injected into chamber 102 through inlet 104 and allowed to drain through outlet 106 for a sufficient amount of time, thereby regulating the temperature of housing 38.

After the kneadable material has been mixed with preselected liquids in the side feeder assembly 16, it is conveyed into the kneader cylinder 18 through inlet 28. Once in the cylinder 18, the material is kneaded to a desired consistency. In operation, the side feeder assembly 16 provides a continuous back pressure to cylinder 18 causing the kneaded material to be extruded out of the cylinder 18 through outlet 30 at a substantially continuous rate.

As illustrated in FIGS. 1–5 and 8–11, in order to automatically cut predetermined volumes of kneaded material extruding out of outlet 30, the cutter assembly 20 is attached to the cylinder 18 directly adjacent outlet 30. The cutter assembly 20 is responsive to the volume of material extruding out of outlet 30 and, to simplify the cleaning process, is hingedly connected to cylinder 18 for selective movement between a closed operating position, shown in FIGS. 1–4 and 8–11, and an open cleaning position, shown in FIGS. 5 and 6.

The cutter assembly 20 includes a housing 108 which has a first opening 110 for receiving the continuous stream of kneaded material. When the housing 108 is in the closed operating position, the first opening 110 is co-axially aligned and in communication with outlet 30. When in the open cleaning position, the housing 108 is rotated up to approximately 100 degrees away from outlet 30 for cleaning purposes. A second rectangular opening 112 is defined by housing 108 for discharging severed pieces of kneaded material. Structurally, the housing 108 is constructed in a box-like fashion having a pair of side plates 114, a back plate 116, an angled front upper support plate 118, a front lower support plate 120, a transparent front door 122, and a transparent top cover 124. Front door 122 and top cover 124 are preferably constructed out of a polycarbon material. The back plate 116 defines the first opening 110 and the lower portions of side plates 114, front lower support plate 120 and back plate 116 define the second rectangular opening 112. The front door 122 is slidably mounted between the pair of side plates 114 such that the door is slidably moveable between an open position, shown in FIG. 9, and a closed position. A discharge cone 126 is attached to an interior surface of back plate 116 in co-axial alignment with first opening 110 for optimally shaping the continuous stream of kneaded material entering the housing 108 through the first opening 110. The discharge cone 126 is sized according to the discharge rate (lbs/hour) of the kneaded material. For example, if the kneaded material is a food product such as dough, the system 10 may discharge material at a rate ranging from approximately 600–2500 lbs/hour which will require a diameter of the discharge cone 126 of approximately 9–12 inches. More specifically, if the system 10 is designed to discharge 2500 lbs/hour of food grade material, the diameter of the discharge cone 126 should be approximately nine inches with the cutter assembly 20 cutting approximately every six seconds to produce a 8.5 lbs. loaf.

A blade assembly 128 is rotatably mounted within housing 108 for automatically cutting predetermined volumes of kneaded material from the continuous stream entering the housing through the first opening 110 and discharge cone 126. It includes first 130 and second 132 knife arms each rotatably mounted at a proximal end thereof to an interior surface of one of the pair of side plates 114. A laterally extending knife blade 134 interconnects the first 130 and second 132 knife arms at a distal end of arms 130 and 132. In operation, the knife blade 134 rotates within the housing 108 in a circular motion and passes in close proximity of approximately 1/16 inch to the discharge cone severing a predetermined volume of kneaded material that has extruded therefrom. The knife blade 134 rotates about an axis 135 which passes through the distal ends of knife arms 130 and 132. In order to rotate the blade assembly 128, first knife arm 130 is operatively attached to an electric drive means 136 which is attached to one of the side plates 114 of housing 108. The electric drive means 136 is comprised of a conventional electric motor 138 having an internal brake which is selectively energizable to selectively rotate the blade assembly 128 within the housing 108.

A first sensor means 140 is attached to the housing 108 and electrically connected to motor 138 for detecting when the predetermined volume of kneaded material has entered the housing 108 through discharge cone 126. In operation, the first sensor means 140 produces a first signal upon detecting the predetermined volume wherein the first signal energizes motor 138 to start rotating the blade assembly 128. The top cover 124 includes a selectively rotatable disk 142 for rotatably positioning the first sensor means 140 on the top cover 124 relative the discharge cone 126. The first sensor means 140 is attached to an outer periphery of disk 142 wherein rotation of disk 142 to a preselected orientation defines a distance between the "proximity eye" of the first sensor means 140 and the discharge cone 126 which dictates the predetermined volume of the kneaded material (i.e., how much material is extruded from the discharge cone 126). The distance may range from approximately one inch to six inches. Depending on the diameter of the discharge cone 126, such range of distance will allow approximately 8.5–20 lbs. of food product material to be extruded from discharge cone 126 before being cut. The first sensor means 140 comprises a conventional proximity switch.

Figure 9:
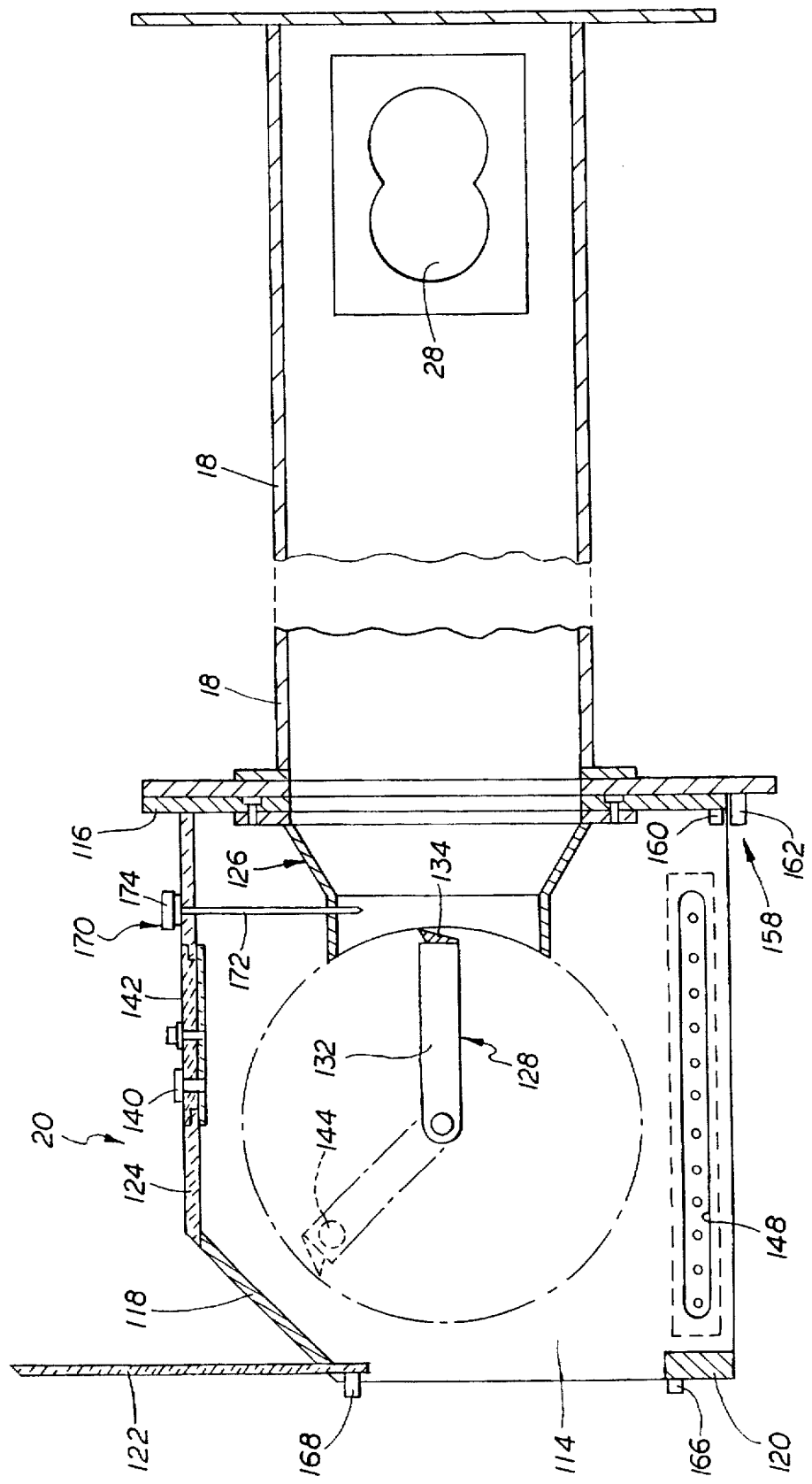
FIG. 9 is a side sectional view of the cutter assembly.

A second sensor means 144 is selectively attached to the housing 108 and electrically connected to motor 138 for defining the home position of the blade assembly 128. The second sensor means 144 detects when the blade assembly 128 is at the home position and produces a second signal which de-energizes motor 138 automatically engaging the internal brake so that the blade assembly 128 stops and remains at the home position until motor 138 is re-energized by the first signal from the first sensor means 140. The second sensor means 144 comprises a conventional proximity switch selectively attached to one of the pair of side plates 114 such that the home position of the blade assembly 128 is directly adjacent the interior surface of the angled front upper support plate 118. The knife blade 134 remains in close proximity to the interior surface of the angled front upper support plate 118 while in the home position for safety purposes, as shown in FIGS. 1 and 9.

A third sensor means 146 is attached to the housing 108 and electrically connected to motor 138 for detecting the presence of an object, such as an arm or hand, in the second opening 112. The third sensor means 146 produces a third signal upon detecting the presence of the object in the second opening 112 wherein the third signal de-energizes motor 138 automatically engaging the internal brake so that the blade assembly 128 stops and remains at its current position until the object is removed from the second opening 112. The pair of side plates 114 define first 148 and second 150 opposing elongated slots on a lower portion thereof, respectively, for operatively engaging the third sensor means 146. The third sensor means 146 comprises an infrared curtain emitter 152 and an infrared curtain receiver 154 mounted on exterior surfaces of the pair of side plates 114 directly adjacent the first 148 and second 150 opposing elongated slots, respectively. In operation, emitter 152 emits an infrared curtain (not shown) through first slot 148, across second opening 112, through second slot 150, into receiver 154. Housing 108 further includes a pair of infrared curtain guards 156 attached to the exterior surfaces of side plates 114 so as to substantially enclose emitter 152 and receiver 154, respectively.

A fourth sensor means 158 is attached to both the housing 108 and the cylinder 18 and is electrically connected to motor 138 for detecting when housing 108 is rotated in the open cleaning position. The fourth sensor means 158 produces a fourth signal upon detecting the housing 108 in the open cleaning position wherein the fourth signal de-energizes motor 138 automatically engaging the internal brake so that the blade assembly 128 stops and remains at its current position until the housing 108 is returned to the closed operating position. The fourth sensor means 158 comprises a conventional magnetic limit switch having electrically communicating first 160 and second 162 portions. First portion 160 is attached to back plate 116 and the second portion 162 is attached to the cylinder 18 so that it is in close proximity to first portion 160 when housing 108 is in the closed operating position. Separation of first 160 and second 162 portions produces the fourth signal.

A fifth sensor means 164 is attached to both the front door 122 and front lower support plate 120 and is electrically connected to motor 138 for detecting when the front door 122 is in the open position. The fifth sensor means 164 produces a fifth signal upon detecting the door 122 in the open position wherein the fifth signal de-energizes motor 138 automatically engaging the internal brake so that the blade assembly 128 stops and remains at its current position until the door 122 is returned to the closed position. The fifth sensor means 164 comprises a conventional magnetic limit switch having first 166 and second 168 electrically communicating portions. The first portion 166 is attached to an exterior surface of the front lower support plate 120 while the second portion 168 is attached to a lower portion of front door 122 so that it is in close proximity to first portion 166 when door 122 is in the closed position. When the two portions 166 and 168 are separated, such as when the door is slid open, the switch produces the fifth signal.

The cutter assembly 20 further includes a temperature means 170, operatively attached to the housing 108, for determining the temperature of the continuous stream of kneaded material in the discharge cone 126. The temperature means 170 comprises a temperature probe 172 extending downwardly from top cover 124 into discharge cone 126. Probe 172 includes a temperature indicator 174 positioned on an exterior surface of top cover 124 for visually indicating the temperature of the continuous stream of kneaded material in discharge cone 126.

While a description of the present invention has been provided in detail, such description is for illustrative purposes only, and it is to be understood that changes and variations may be made without departing from the spirit or scope of the following appended claims.

What is claimed is:

1. A side feeder assembly for use in a mixing system having a frame and a kneader cylinder with an inlet, said side feeder assembly adapted to be slidably movable on said frame between an operating position and a cleaning position, said said feeder assembly comprising:

(a) a preblender housing;
   (b) means for slidably and rotatably mounting said preblender housing on said frame, said preblender housing being slidably movable between said operating and cleaning positions;
   (c) an input housing, said input housing being detachably connected to said preblender housing when said input housing is in said operating position;
   (d) means for slidably mounting said input housing on said frame, said input housing being slidably movable between said operating and cleaning positions, said input housing and said preblender housing being detached from one another when said input and preblender housings are in said cleaning position, said preblender housing being free to rotate relative to said input housing when said input and preblender housings are in said cleaning position;
   (e) preblending means, operatively disposed within both said input and preblender housings when in said operating position, for preblending a supply of kneadable material and for conveying said material from said input housing through said preblender housing into said kneader cylinder, said preblending means being removable from said input and preblender housing when in said cleaning position; and
   (f) driving means, operatively connected to said preblending means, for driving said preblending means.

2. A side feeder assembly as defined in claim 1, wherein said preblender housing comprises first and second end plates with first and second communicating tubular portions connected therebetween, said tubular portions having an exterior surface and a passage extending therethrough which is in communication with first and second openings defined in said first and second end plates, respectively.

3. A side feeder assembly as defined in claim 2, wherein said first end plate of said preblender housing is detachably connected to said kneader cylinder when in said operating position such that said first opening communicates with said inlet during operation, said preblender housing detached from said kneader cylinder when in said cleaning position and slidably displaced on said frame a predetermined distance therefrom, said predetermined distance being sufficient to allow access to said preblender housing for cleaning purposes.

4. A side feeder assembly as defined in claim 3, wherein said input housing comprises first and second end walls and first and second side walls which define an inlet for receiving said supply of kneadable material, said first end wall further defining an outlet for dispensing said supply of kneadable material, said first and second side walls converging inwardly to define first and second lower semi-tubular channels, respectively.

5. A side feeder assembly as defined in claim 4, wherein said first end wall of said input housing is detachably connected to said second end plate of said preblender housing when in said operating position such that said outlet communicates with said second opening during operation, said input housing being slidably displaced on said frame and predetermined distance from said preblender housing when in said cleaning position, said predetermined distance being sufficient to allow access to said input housing for cleaning purposes.

6. A side feeder assembly as defined in claim 1, wherein said means for slidably and rotatably mounting said preblender housing on said frame comprises:

(a) at least two substantially parallel rails disposed on said frame, said rails being transversely oriented relative to said kneader cylinder;
   (b) a support plate extending laterally between said rails, said support plate having at least a pair of linear bearings attached to a bottom surface thereof for slidably mounting said support plate on said rails; and
   (c) a rotatable support post operatively attached intermediate said support plate and said preblender housing for rotatably supporting said preblender housing on said support plate, said preblender housing being slidably movable with said support plate on said frame between said operating and cleaning positions, said preblender housing being rotatable relative to said support plate when in said cleaning position.

7. A side feeder assembly as defined in claim 6, wherein said substantially parallel rails are substantially perpendicular to said inlet on said kneader cylinder.

8. A side feeder assembly as defined in claim 1, wherein said means for slidably mounting said input housing on said frame comprises:
   (a) at least two substantially parallel rails disposed on said frame, said rails being transversely oriented relative to said kneader cylinder;
   (b) a pair of upright side support plates longitudinally disposed relative to said rails, said plates each having bearing means secured to a bottom edge thereof for slidably mounting said plates on said rails, respectively;
   (c) said pair of side support plates interconnected by at least two vertically disposed laterally extending crossmembers and at least two horizontally disposed laterally extending crossplates wherein said input housing is attached to said vertically disposed crossmembers for sliding movement therewith on said frame between said operating and cleaning positions.

9. A side feeder assembly as defined in claim 8, wherein said substantially parallel rails are substantially perpendicular to said inlet on said kneader cylinder.

10. A side feeder assembly as defined in claim 3, further comprising means, operatively attached to said preblender housing, for regulating the temperature of said preblender housing.

11. A side feeder assembly as defined in claim 10, wherein said temperature regulating means comprises a water jacket substantially encasing said tubular portions defining a chamber between said exterior surface of said tubular portions and an interior surface of said water jacket, said water jacket including a water inlet and water outlet both in fluid communication with said chamber wherein a supply of temperature controlled water is injected into said chamber through said inlet and allowed to drain through said outlet thereby regulating the temperature of said preblender housing.

12. A side feeder assembly as defined in claim 3, further comprising means, operatively attached to said preblender housing, for adding preselected liquids to said supply of kneadable material in said preblender housing, said liquid adding means in fluid communication with said passage.

13. A side feeder assembly as defined in claim 12, wherein said liquid adding means comprises a plurality of check valves operatively attached to said preblender housing for engaging pressurized liquid supply hoses.

14. A side feeder assembly as defined in claim 5, wherein said driving means comprises an electric motor and gear box operatively attached to said second end wall of said input housing, said gear box having a pair of output shafts which extend through said second end wall into said input housing for operatively engaging said preblending means, said shafts rotated in opposite directions with respect to each other during operation.

15. A side feeder assembly as defined in claim 14, further comprising a bushing plate attached to said first end plate of said preblender housing, said bushing plate including bushing means for operatively engaging said preblending means during operation, said bushing plate disposed between said first end plate and said kneader cylinder when said preblender housing is in said operating position.

16. A side feeder assembly as defined in claim 15, wherein said preblending means comprises a pair of oppositely threaded helical screws slidably mounted on said pair of output shafts for rotation thereon, said screws extending through said input housing in said first and second lower semi-tubular channels, respectively, through said outlet in said first end wall, through said second opening in said second end plate, through said passage in said tubular portions, through said first opening in said first end plate, wherein they operatively engage said bushing means on said bushing plate during operation.

17. An improved mixing system for mixing and dispensing kneaded material, said mixing system comprising:
   (a) a frame;
   (b) a top feeder assembly operatively attached to said frame for maintaining a supply of kneadable material;
   (c) a side feeder assembly slidably mounted on said frame for selective movement between an operating position and a cleaning position, said side feeder assembly in communication with said top feeder assembly when in said operating position for receiving and preblending said supply of kneadable material, said side feeder assembly discharging said kneadable material once sufficiently preblended;
   (d) a kneader cylinder operatively mounted on said frame and in communication with said side feeder assembly when in said operating position, said cylinder having an inlet for receiving said kneadable material discharged from said side feeder assembly and an outlet for extruding a continuous stream of kneaded material;
   (e) a cutter assembly hingedly attached to said kneader cylinder for automatically cutting substantially equal volumes of said kneaded material from said continuous stream extruded through said outlet, said cutter assembly selectively movable between a closed operating position and an open cleaning position, said cutter assembly including a housing and a blade assembly rotatably mounted within said housing, said housing including a first opening for receiving said continuous stream of kneaded material and a pair of opposing side plates; and
   (f) means for selectively rotating said blade assembly within said housing;
   (g) said blade assembly including a pair of knife arms, each said knife arm being mounted at a proximal end thereof to an interior surface of one of said side plates, said blade assembly further including a knife blade interconnecting said knife arms at a distal end of said arms;
   (h) said knife blade being selectively rotatable within said housing in a circular motion about an axis passing through said proximal ends of said knife arms so as to cut said kneadable material thereby severing one of said substantially equal volumes of said kneaded material from said continuous stream of kneaded material, said knife blade rotating away from said continuous stream of kneadable material and toward a home position after cutting each said volume of said kneadable material.

18. An improved mixing system as defined in claim 17, wherein said side feeder assembly comprises:
   (a) a preblender housing having first and second end plates with first and second contiguous tubular portions connected therebetween, said tubular portions having an exterior surface and a communicating passage therethrough which is in communication with first and second openings defined in said first and second end plates, respectively;

(b) means for slidably and rotatably mounting said preblender housing on said frame, said preblender housing being slidably movable between said operating position, wherein said first end plate is detachably connected to said kneader cylinder such that said first opening communicates with said inlet during operation, and said cleaning position, wherein said preblender housing is detached from said kneader cylinder and slidably displaced on said frame a predetermined distance therefrom allowing access to said preblender housing for cleaning purposes;

(c) an input housing having first and second end walls and first and second side walls which define an inlet for receiving said supply of kneadable material from said top feeder assembly, said first end wall including an outlet for discharging said kneadable material, said first and second side walls converging inwardly to define first and second lower semi-tubular channels, respectively;

(d) means for slidably mounting said input housing on said frame, said input housing being slidably movable between said operating position, wherein said first end wall is detachably connected to said second end plate on said preblender housing such that said outlet communicates with said second opening during operation, and said cleaning position, wherein said input housing is detached from said preblender housing and slidably displaced on said frame a predetermined distance therefrom allowing access to said input housing for cleaning purposes, said preblender housing being free to rotate relative to said input housing when said input and preblender housings are in said cleaning position;

(e) preblending means, operatively disposed within both said input housing and said preblender housing when in said operating position, for preblending said supply of kneadable material, said preblending means conveying said kneadable material from said input housing through said preblender housing into said kneader cylinder, said preblending means being removable from said input housing and said preblender housing when in said cleaning position; and (f) driving means, attached to said input housing and operatively connected to said preblending means, for driving said preblending means.

19. An improved mixing system as defined in claim 18, wherein said means for slidably and rotatably mounting said preblender housing on said frame comprises:

(a) at least two substantially parallel rails disposed on said frame, said rails being transversely oriented relative to said kneader cylinder;

(b) a support plate extending laterally between said rails, said support plate having bearing means attached to a bottom surface thereof for slidably mounting said support plate on said rails; and (c) a rotatable support post operatively attached intermediate said support plate and said preblender housing for rotatably supporting said preblender housing on said support plate, said preblender housing being slidably movable with said support plate on said frame between said operating position and said cleaning position, said preblender housing being rotatable relative to said support plate when in said cleaning position.

20. An improved mixing system as defined in claim 19, wherein said means for slidably mounting said input housing on said frame comprises:

(a) said at least two substantially parallel rails disposed on said frame;

(b) a pair of upright side support plates longitudinally disposed relative said rails, said plates each having bearing means secured to a bottom edge thereof for slidably mounting said plates on said rails, respectively;

(c) said pair of side support plates interconnected by at least two vertically disposed laterally extending crossmembers and at least two horizontally disposed laterally extending crossplates wherein said input housing is attached to said vertically disposed crossmembers for sliding movement therewith on said frame between said operating position and said cleaning position.

21. An improved mixing system as defined in claim 20, wherein said substantially parallel rails are substantially perpendicular to said kneader cylinder.

22. An improved mixing system as defined in claim 18, wherein said side feeder assembly further comprises means, operatively attached to said preblender housing, for regulating the temperature of said preblender housing.

23. An improved mixing system as defined in claim 22, wherein said temperature regulating means comprises a water jacket substantially encasing said preblender housing defining a chamber between said exterior surface of said tubular portions and an interior surface of said water jacket, said water jacket including a water inlet and water outlet in fluid communication with said chamber wherein temperature controlled water is injected into said chamber through said inlet and allowed to drain through said outlet.

24. An improved mixing system as defined in claim 18, wherein said side feeder assembly further comprises means, operatively attached to said preblender housing, for adding preselected liquids to said supply of kneadable material in said preblender housing, said means in fluid communication with said passage.

25. An improved mixing system as defined in claim 24, wherein said means for adding preselected liquids to said supply of kneadable material in said preblender housing comprises a plurality of check valves operatively attached to said preblender housing for engaging pressurized liquid supply hoses.

26. An improved mixing system as defined in claim 18, wherein said driving means comprises an electric motor and gear box operatively attached to said second end wall of said input housing, said gear box having a pair of output shafts which extend through said second end wall into said input housing for operatively engaging said preblending means, said shafts rotated in opposite directions with respect to each other during operation.

27. An improved mixing system as defined in claim 26, wherein said side feeder assembly further comprises a bushing plate attached to said first end plate of said preblender housing, said bushing plate including a pair of bushings for operatively engaging said preblending means during operation, said bushing plate disposed between said first end plate and said kneader cylinder when said preblender housing is in said operating position.

28. An improved mixing system as defined in claim 27, wherein said preblending means comprises a pair of oppositely threaded helical screws detachably mounted on said pair of output shafts for rotation thereon, said screws extending through said input housing in said first and second lower semi-tubular channels, respectively, through said outlet in said first end wall, through said second opening in said second end plate, through said passage in said tubular portions, through said first opening in said first end plate, wherein they operatively engage said bushings on said bushing plate during operation.

29. An improved mixing system as defined in claim 17, wherein:
(a) said housing further includes a second opening for discharging severed pieces of said kneaded material;
(b) said means for selectively rotating said blade assembly within said housing comprises an electric drive means attached to said housing and operatively connected to said blade assembly for selectively rotating said blade assembly, said electric drive means being selectively energizable to rotate said blade assembly within said housing; wherein said cutter assembly further comprises:
(c) first sensor means, attached to said housing and electrically connected to said electric drive means, for detecting when each of said substantially equal volumes of said kneaded material enters said housing, said first sensor means producing a first signal upon detecting said predetermined volume, said first signal energizing said electric drive means to rotate said blade assembly; and
(d) second sensor means, attached to said housing and electrically connected to said electric drive means, for defining said home position of said blade assembly, said second sensor means detecting when said blade assembly is at said home position and producing a second signal, said second signal de-energizing said electric drive means so that said blade assembly remains at said home position until said electric drive means is re-energized by said first signal.

30. An improved mixing system as defined in claim 29, wherein said cutter assembly further comprises third sensor means, attached to said housing and electrically connected to said electric drive means, for detecting the presence of an object in said second opening, said third sensor means producing a third signal upon detecting the presence of said object in said second opening, said third signal de-energizing said electric drive means until said object is removed from said second opening.

31. An improved mixing system as defined in claim 30, wherein said cutter assembly further comprises fourth sensor means, attached to both said housing and said kneader cylinder and electrically connected to said electric drive means, for detecting when said housing is in said open cleaning position, said fourth sensor means producing a fourth signal upon detecting said housing in said open cleaning position, said fourth signal de-energizing said electric drive means until said housing is returned to said closed operating position.

32. An improved mixing system as defined in claim 31, wherein said housing comprises a box-like housing having said pair of side plates, a back plate, an angled front upper support plate, a front lower support plate, a front door, and a transparent top cover wherein said back plate defines said first opening and said side plates, said front lower support plate, and said back plate define said second opening.

33. An improved mixing system as defined in claim 32, wherein said housing further comprises a discharge cone attached to an interior surface of said back plate, said discharge cone co-axially aligned with said first opening for optimally shaping said continuous stream of kneaded material entering said housing prior to said cutting by said blade assembly.

34. An improved mixing system as defined in claim 33, wherein said cutter assembly further comprises temperature means, operatively attached to said housing, for determining the temperature of said continuous stream of kneaded material in said discharge cone.

35. An improved mixing system as defined in claim 34, wherein said temperature means comprises a temperature probe extending downwardly from said transparent top cover into said discharge cone, said temperature probe including temperature indication means positioned on an exterior surface of said transparent top cover for visually indicating the temperature of said continuous stream of kneaded material in said discharge cone.

36. An improved mixing system as defined in claim 29, wherein said housing of said cutter assembly further includes an angled front upper support plate extending between said pair of opposing side plates and said second sensor means comprises a proximity switch selectively attached to one of said pair of side plates such that said home position of said blade assembly is directly adjacent an interior surface of said angled front upper support plate, said knife blade remaining in close proximity to said interior surface of said angled front upper support plate while in said home position.

37. An improved mixing system as defined in claim 32, wherein said front door is slidably mounted between said pair of side plates, said door being slidably movable between an open position and a closed position.

38. An improved mixing system as defined in claim 37, wherein said cutter assembly further comprises fifth sensor means, attached to both said front door and said front lower support plate and electrically connected to said electric drive means, for detecting when said front door is in said open position, said fifth sensor means producing a fifth signal upon detecting said door in said open position, said fifth signal de-energizing said electric drive means until said door is returned to said closed position.

39. An improved mixing system as defined in claim 29, wherein said housing of said cutter assembly further includes a transparent top cover extending between said pair of opposing side plates, said transparent top cover including a selectively rotatable disk for rotatably positioning said first sensor means on said transparent top cover relative to said first opening, said first sensor means being attached to an outer periphery of said disk wherein rotation of said disk to a preselected orientation defines a distance between said first sensor means and said first opening which substantially determines said substantially equal volumes of said kneaded material cut by said knife blade.

40. An improved mixing system as defined in claim 39, wherein said first sensor means comprises a proximity switch.

41. An improved mixing system as defined in claim 30, wherein said pair of side plates define first and second opposing elongated slots on a lower portion thereof, respectively, for operatively engaging said third sensor means.

42. An improved mixing system as defined in claim 41, wherein said third sensor means comprises an infrared curtain emitter and an infrared curtain receiver mounted on exterior surfaces of said pair of side plates adjacent said first and second opposing elongated slots, respectively, said emitter emitting an infrared curtain through said first slot, across said second opening, through said second slot, into said receiver.

43. An improved mixing system as defined in claim 42, wherein said housing further includes a pair of infrared curtain guards attached to said exterior surfaces of said side plates so as to substantially enclose said infrared curtain emitter and said infrared curtain receiver.

44. An improved mixing system as defined in claim 32, wherein said fourth sensor means comprises a magnetic limit switch having first and second portions, said first portion being attached to said back plate, said second portion being attached to said kneader cylinder in close proximity to said first portion.

45. An improved mixing system as defined in claim 38, wherein said fifth sensor means comprises a magnetic limit switch having first and second portions, said first portion being attached to an exterior surface of said front lower support plate, said second portion being attached to an exterior surface of said front door in close proximity to said first portion.

\* \* \* \* \*